July 22, 1924.
K. ARNSTEIN
PANELWORK FOR LIGHT STRUCTURES
Filed June 28, 1920
1,502,227
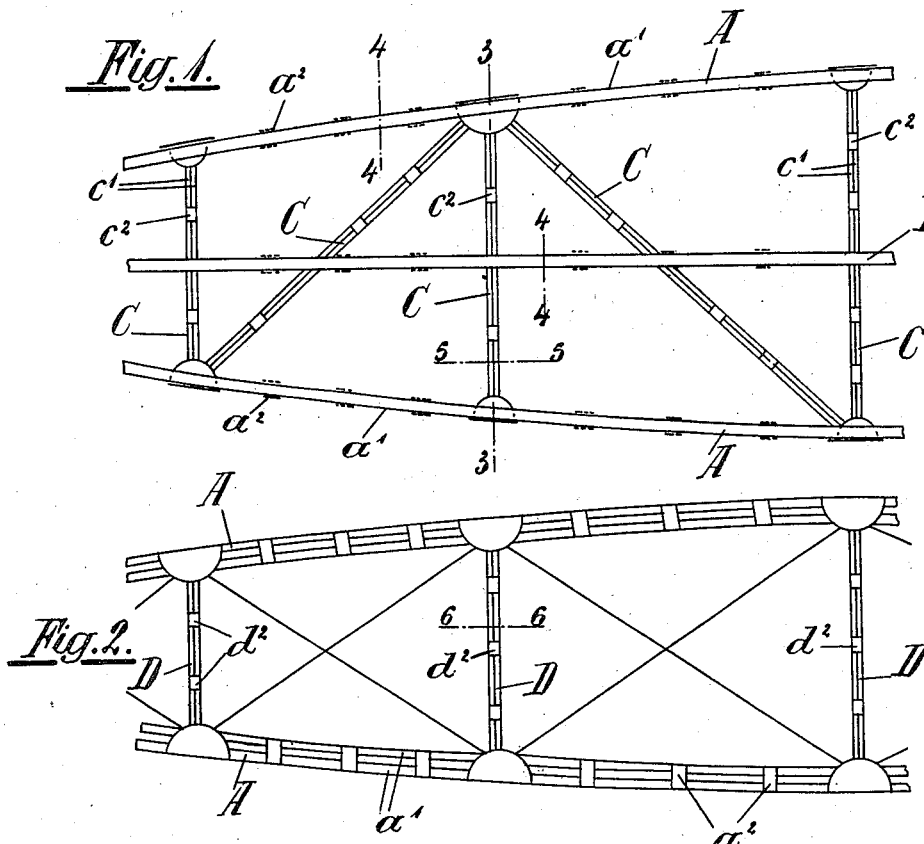
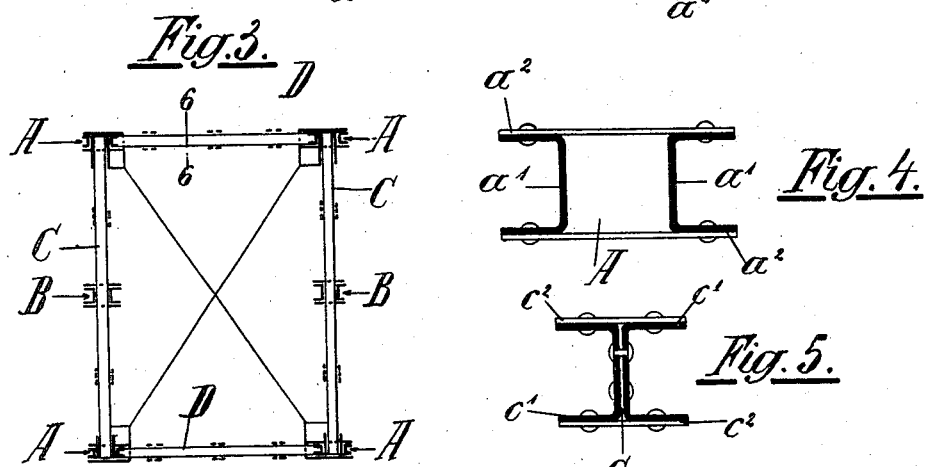
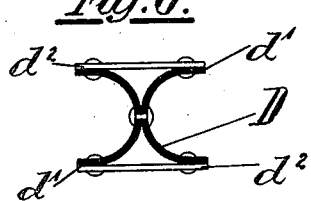
INVENTOR:
Dr Karl Arnstein Patented July 22, 1924.

1,502,227

UNITED STATES PATENT OFFICE.

KARL ARNSTEIN, OF FRIEDRICHSHAFEN, GERMANY, ASSIGNOR TO THE FIRM LUFT-SCHIFFBAU ZEPPELIN, GESELLSCHAFT MIT BESCHRANKTER HAFTUNG, OF FRIEDRICHSHAFEN, GERMANY.

PANELWORK FOR LIGHT STRUCTURES.

Application filed June 28, 1920. Serial No. 392,485.

(GRANTED UNDER THE PROVISIONS OF THE ACT OF MARCH 3, 1921, 41 STAT. L., 1313.)

*To all whom it may concern:*

Be it known that I, KARL ARNSTEIN, a citizen of the Czechoslovakian Republic, residing at Friedrichshafen a/B., Germany, have invented certain new and useful Improvements in Panelwork for Light Structures (for which I have filed application in Germany February 25th, 1918), of which the following is a specification.

In the construction of aircraft of various kinds a particular problem is met in that it is necessary to form members which will be stiff and strong under normal loads, but which will be highly elastic under excess loads. In ordinary constructions, such as those of buildings or bridges where weight is not a vital factor, the members can be made heavy enough to be substantially stiff under maximum or overloads. With aircraft this is not permissible, as the weight must be kept to a minimum. The present invention relates in particular to a form of panel work for aircraft utilizing compound beams or trusses which are so designed that they have substantially no excess weight to exceed the normal loads without deflection, but which are likewise so designed that under excess loads they will show a high degree of elasticity and not take on a permanent set or deflection. I have found that this result can be obtained by forming the compound beams or trusses by combining two U-shaped channels formed of substantially uniform thickness of metal with the corners rounded and connecting these channels with the webs facing each other and the openings extending outward. The members are connected by spaced cross strips and if desired the webs themselves may likewise be connected together. However, this does not give quite as high a degree of elasticity as where the webs are spaced apart.

In the drawings affixed to this specification and forming part thereof different modifications embodying my invention are illustrated by way of example.

Figs. 1 to 3 are a side view, a plan and a section, respectively, of the middle part of the frame work of a flying machine body.

Figs. 4 to 6 are sections along lines 4—4, 5—5 and 6—6 respectively in Figs. 1-3 drawn to a larger scale and as a comparison Fig. 7 is a U-section of the ordinary iron construction, of the same height of web.

The body frame has main booms A and middle booms B at about medium height of the side panels, the cross section of booms A and B being shown in Fig. 4. The struts C of the side panels are shaped as shown in Fig. 5 and the cross struts of the upper side of the frame are as shown in Fig. 6.

The main and middle booms A are composed of two thin-walled longitudinal metal strips $a^1$ of U-section and of a number of transverse bands $a^2$ arranged in pairs. The webs of the longitudinal strips facing each other are arranged at a certain distance from each other. The length of the short flat cross bands $a^2$ depends upon this distance said bands bridging the empty distance at certain intervals and being connected by rivets with the flanges of the longitudinal strips.

The struts C also comprise two longitudinal strips $c^1$ of U-shape section with webs facing each other. But in this case, contrary to the booms, the webs are in direct contact. Apart from the short cross bands $c^2$ bridging the distance at certain intervals and riveted on to the flanges as well the webs of the longitudinal strips $c^1$ are directly connected by a double row of rivets. The proportions are chosen so that the side panel struts C are not only guided as in shoes in the hollow space of the main booms but are enclosed as well from two sides by the webs of the middle booms.

In the struts D two longitudinal strips $d^1$ of a semicircular section touch each other by the middle part of their webs; here they are continuously connected by a row of rivets and apart from that at intervals by short cross bands $d^2$.

As the figures show, reliable joint connections can be effected in the simplest manner without the slightest difficulty. Besides the butt plates can easily be designed so that they can be used for directly attaching thereto tension wires. A comparison of the longitudinal strips $A^1$ of Fig. 4 and a normal U-section bar (Fig. 7) of identical height of web and width of flange shows the weight saved by using composed panel work bars as compared to normal U-sections.

I claim:

1. A structural member having a high moment of elasticity and a low degree of permanent set under repeated strains for use in aircraft construction, comprising two strips or bands of thin sheet metal each bent into channel form with rounded corners and of a substantially uniform thickness throughout its cross section, said strips extending substantially parallel to one another with their middle webs facing one another and a plurality of transverse strips spaced apart from each other and extending across the channels and fixed to the flanges thereof on both sides of said channels.

2. A structural member having a high moment of elasticity and a low degree of permanent set under repeated strains, for use in aircraft construction comprising two strips or bands each of thin sheet metal having channel form in cross-section and of a substantially uniform thickness throughout its cross-section, said strips extending substantially parallel to and spaced apart from each other with their middle webs facing one another, and a plurality of relatively narrow transverse strips spaced apart from each other and extending across the channels and fixed to the flanges on both sides of said channels.

In testimony whereof I affix my signature.

KARL ARNSTEIN.